Patented June 21, 1927.

1,633,485

UNITED STATES PATENT OFFICE.

KURT HERRDEGEN, OF LUDWIGSHAFEN-ON-THE-RHINE, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY.

PROCESS OF PURIFYING ALKALI-METAL CYANIDE SOLUTIONS CONTAINING SULPHIDES.

No Drawing. Application filed November 27, 1926, Serial No. 151,263, and in Germany December 4, 1925.

Leaving out of consideration complicated processes which are not practicable, the elimination of hydrogen sulphide or sulphides from solutions of alkali metal cyanides is possible by the action of finely divided metallic copper or zinc. During the action of these metals, however, on concentrated alkali metal cyanide solutions containing sulphides, ammonia is formed after a short time, the cyanides undergoing decomposition. It is also found that alkali metal sulphide is still present in the solutions even after prolonged action of the said metals.

Zinc or copper hydroxid may be employed with more advantage instead of the metals for precipitating the combined sulphur, and lead hydroxid also precipitates the sulphur completely and immediately in the form of lead sulphide. In this case, however, secondary reactions occur, insoluble metallic cyanides and soluble complex cyanides being formed, and, in the case of some hydroxids as those of lead or zinc, alkali metal plumbite or alkali metal zincate are produced.

I have now found that combined sulphur can be immediately and completely separated from solutions of alkali metal cyanides, without the occurrence of any disturbing secondary reactions, by employing bismuth compounds capable of forming bismuth sulphide such as the hydroxid or salts of bismuth for that purpose. In this case, pure bismuth sulphide is precipitated, the regeneration of which causes no inconvenience.

The following example further illustrates how the invention may be carried out in practice but the invention is not restricted thereto.

*Example.*

A cold cyanide solution, such as is obtained by leaching the crude cyanide obtained from carbon, soda ash and nitrogen by the Bucher process, which solution contains about 30 per cent of sodium cyanide, 0.02 per cent of sodium sulphide and 1.0 per cent of sodium hydroxid, is treated with moist bismuth hydroxid, added slowly while stirring until the precipitant is in slight excess. The solution is then filtered, and the bismuth sulphide sludge washed.

I claim:

The process of purifying alkali metal cyanide solutions containing sulphides which consists in treating the solution with a bismuth compound capable of forming bismuth sulphide.

In testimony whereof I have hereunto set my hand.

KURT HERRDEGEN.